(12) United States Patent  
Kobayashi

(10) Patent No.: US 8,159,215 B2
(45) Date of Patent: Apr. 17, 2012

(54) INDUCTION DETECTING ROTARY ENCODER

(75) Inventor: Hirokazu Kobayashi, Saitama (JP)

(73) Assignee: Mitutoyo Corporation, Kanagawa (JP)

( * ) Notice: Subject to any disclaimer, the term of this patent is extended or adjusted under 35 U.S.C. 154(b) by 365 days.

(21) Appl. No.: 12/577,883

(22) Filed: Oct. 13, 2009

(65) Prior Publication Data

US 2010/0102803 A1 Apr. 29, 2010

(30) Foreign Application Priority Data

Oct. 28, 2008 (JP) ................. 2008-276420

(51) Int. Cl.
*G01B 7/30* (2006.01)
(52) U.S. Cl. .................. 324/207.25; 324/207.11
(58) Field of Classification Search .............. 324/207.25
See application file for complete search history.

(56) References Cited

U.S. PATENT DOCUMENTS

| | | | |
|---|---|---|---|
| 6,111,402 A | 8/2000 | Fischer | |
| 7,385,389 B2 | 6/2008 | Tahara et al. | |
| 2011/0227562 A1 * | 9/2011 | Sasaki | 324/207.25 |

FOREIGN PATENT DOCUMENTS

| | | |
|---|---|---|
| JP | 10-213407 | 8/1998 |
| JP | 2006-322927 | 11/2006 |

OTHER PUBLICATIONS

English language Abstract of JP 10-213407, Aug. 11, 1998.
English language Abstract of JP 2006-322927, Nov. 30, 2006.

* cited by examiner

*Primary Examiner* — Thomas Valone
(74) *Attorney, Agent, or Firm* — Greenblum & Berbstein, P.L.C.

(57) ABSTRACT

An induction detecting rotary encoder has first to third transmitting windings, first to third receiving windings, and first to third flux coupling winding. The first transmitting winding, the first receiving winding, and the first flux coupling body constitute a first angle detection track generating a cyclic change for $N_1$ times per single rotation of the first rotor. The second transmitting winding, the second receiving winding, and the second flux coupling body constitute a second angle detection track generating a cyclic change for $N_2$ times per single rotation of the first rotor. The third transmitting winding, the third receiving winding, and the third flux coupling body constitute a third angle detection track generating a cyclic change for $N_3$ times per single rotation of the second rotor. $N_1$, $N_2$, and $N_3$ are different from one another, and $N_3$ is less than $N_1$ and $N_2$.

4 Claims, 8 Drawing Sheets

INDUCTION DETECTING ROTARY ENCODER

CROSS-REFERENCE TO RELATED APPLICATIONS

The present application claims priority under 35 U.S.C. §119 of Japanese Application No. 2008-276420 filed on Oct. 28, 2008, the disclosure of which is expressly incorporated by reference herein in its entirety.

BACKGROUND OF THE INVENTION

1. Field of the Invention

The present invention relates to an induction detecting rotary encoder that measures an angle of rotation of an object by using flux coupling of wires provided between a rotor and a stator.

2. Description of Related Art

An induction detecting rotary encoder has a stator and a rotor, the stator being provided with transmitting windings and receiving windings, the rotor being provided with flux coupling windings which are flux coupled with the transmitting windings and receiving windings (refer to Related Art 1, for example). With demands for downsizing a micrometer and the like on which the rotary encoder is mounted and for achieving high accuracy, it is required to further reduce a pitch of the receiving windings.

In addition, a rotary encoder having two tracks has problems below. Specifically, accuracy of the two tracks needs to be improved simultaneously in order to enhance accuracy of the rotary encoder. Further, a tolerance is limited for absolute position measurement over an entire measurement range. When the tolerance is increased, the accuracy of the rotary encoder is deteriorated.

[Related Art 1] Japanese Patent Laid-open Publication No. H10-213407

SUMMARY OF THE INVENTION

The present invention provides a highly accurate induction detecting rotary encoder capable of measuring an absolute position.

The induction detecting rotary encoder according to the present invention includes a stator; a first rotor engaged with a rotating shaft, rotated along with the rotating shaft, and provided axially opposite to the stator; a second rotor provided on an external periphery side of the first rotor, rotatable with respect to the first rotor, and axially opposite to the stator; a rotation transferer transferring rotation of the rotating shaft and rotating the second rotor at a speed different from the first rotor; a first transmitting winding, a second transmitting winding, and a third transmitting winding provided in order from inside concentrically to the rotating shaft, on a surface opposite to the first rotor and the second rotor of the stator; a first receiving winding, a second receiving winding, and a third receiving winding provided in order from inside concentrically to the rotating shaft, on the surface opposite to the first rotor and the second rotor of the stator, and associated with the first transmitting winding, the second transmitting winding, and the third transmitting winding; a first flux coupling body and a second flux coupling body provided in order from inside concentrically to the rotating shaft, on the surface opposite to the stator of the first rotor, the first flux coupling body flux-coupling with the first transmitting winding and the first receiving winding, the second flux coupling body flux-coupling with the second transmitting winding and the second receiving winding; and a third flux coupling body provided external to the first flux coupling body and the second flux coupling body concentrically to the rotating shaft, on the surface opposite to the stator of the second rotor, and flux-coupling with the third transmitting winding and the third receiving winding. The first transmitting winding, the first receiving winding, and the first flux coupling body constitute a first angle detection track generating a cyclic change for $N_1$ times per single rotation of the first rotor. The second transmitting winding, the second receiving winding, and the second flux coupling body constitute a second angle detection track generating a cyclic change for $N_2$ times per single rotation of the first rotor. The third transmitting winding, the third receiving winding, and the third flux coupling body constitute a third angle detection track generating a cyclic change for $N_3$ times per single rotation of the second rotor. $N_1$, $N_2$, and $N_3$ are different from one another, and $N_3$ is less than $N_1$ and $N_2$.

The present invention can provide a highly accurate induction detecting rotary encoder capable of measuring an absolute position.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

The embodiments of the induction detecting rotary encoder according to the present invention are explained below with reference to the drawings.

First Embodiment

Entire Configuration of Micrometer Head 1 of First Embodiment

Figure 1:
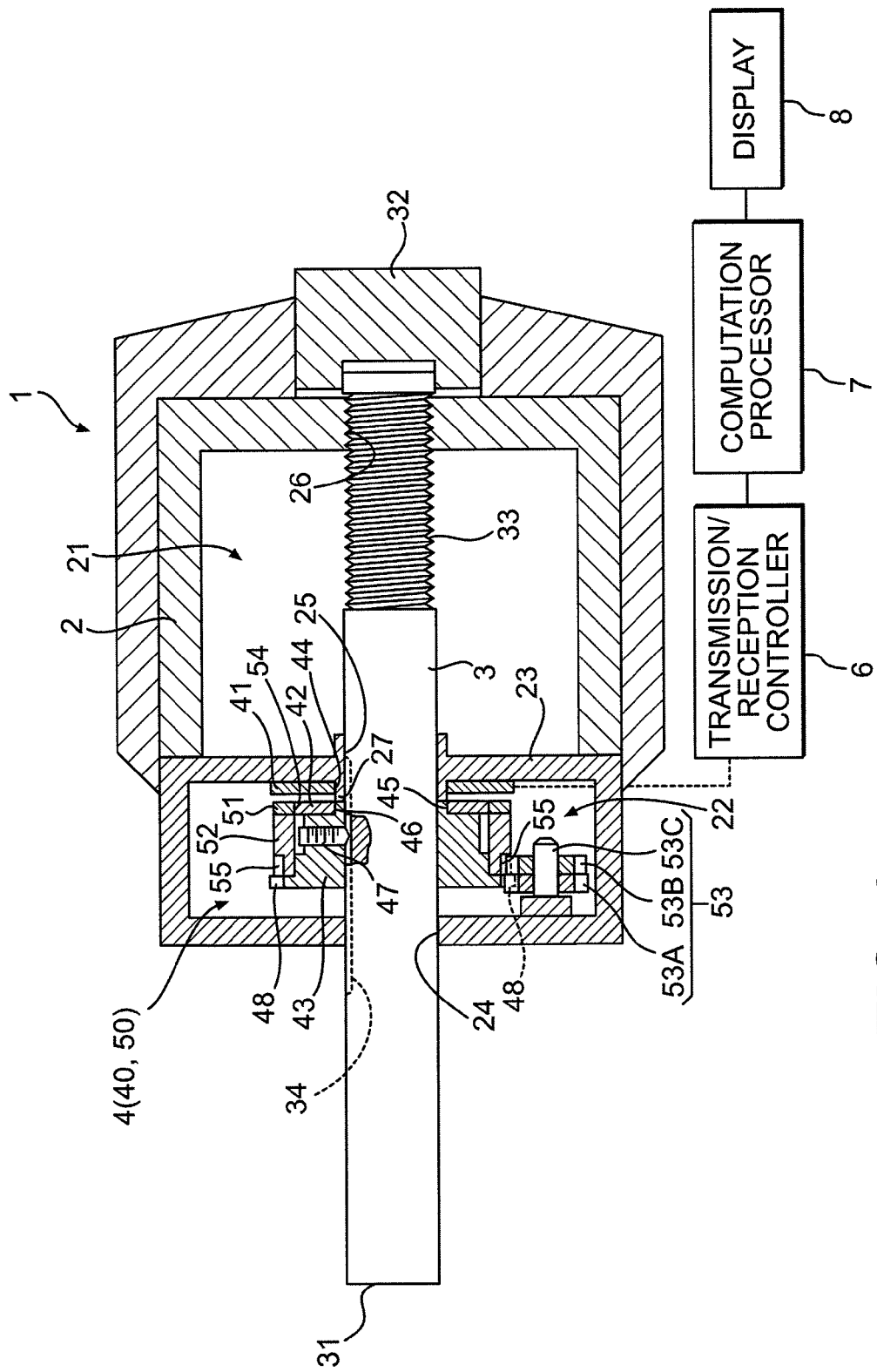
FIG. 1 is a cross-sectional view illustrating a micrometer head according to a first embodiment.

An entire configuration of a micrometer head 1 according to the first embodiment is first explained with reference to FIG. 1, the micrometer head 1 being mounted with an induction detecting rotary encoder 4. FIG. 1 is a cross-sectional view illustrating the micrometer head 1 according to the first embodiment.

The micrometer head 1 has a main body 2, a spindle 3 extending from the main body 2, and an induction detecting rotary encoder 4 provided centering around the spindle 3. The micrometer head 1 further has a transmission/reception controller 6, a computation processor 7, and a display 8. The transmission/reception controller 6 controls transmission and reception to and from the induction detecting rotary encoder 4. The computation processor 7 executes a computation process based on a signal from the transmission/reception controller 6 (induction detecting rotary encoder 4). The display 8 displays a computation result provided by the computation processor 7.

The main body 2 has a substantially cylindrical shape, in which housing spaces 21 and 22 are provided. The housing spaces 21 and 22 are partitioned by a partitioning plate 23. Bores 24 and 25 are provided, through which the spindle 3 is passed, the bore 24 being provided to a wall on a front side (left side in the drawing) of the spindle of the substantially cylindrical main body 2, the bore 25 being provided to the partitioning plate 23. A male thread 26 is provided to an end portion of a base end side (right side in the drawing) of the main body 2. The bores 24 and 25 and the male thread 26 are provided concentrically.

The spindle 3 has a substantially column shape. The spindle 3 has a contact surface 31 in a front end portion and a knob 32 in a base end portion, the contact surface 31 being contacted with an object to be measured (not shown in the drawing). The knob 32 is provided to externally rotate the spindle 3. The spindle 3 is inserted through the bores 24 and 25 of the main body 2. Both end portions of the spindle 3 are projected from the main body 2. A lead thread 33, which is provided to an external periphery of the spindle 3, is screwed into and engaged with the male thread 26 of the main body 2. When the knob 32 is rotated, the spindle 3 is thus protracted and retracted along the bores 24 and 25, in accordance with the engagement of the lead thread 33 and the male thread 26. The lead thread 33, which is formed for 40 rotations at a pitch of 0.5 mm, for example, can protract and retract the spindle 3 for a length of 20 mm. Further, a linear key groove 34 is provided axially in a substantially middle portion of the spindle 3.

Figure 2:
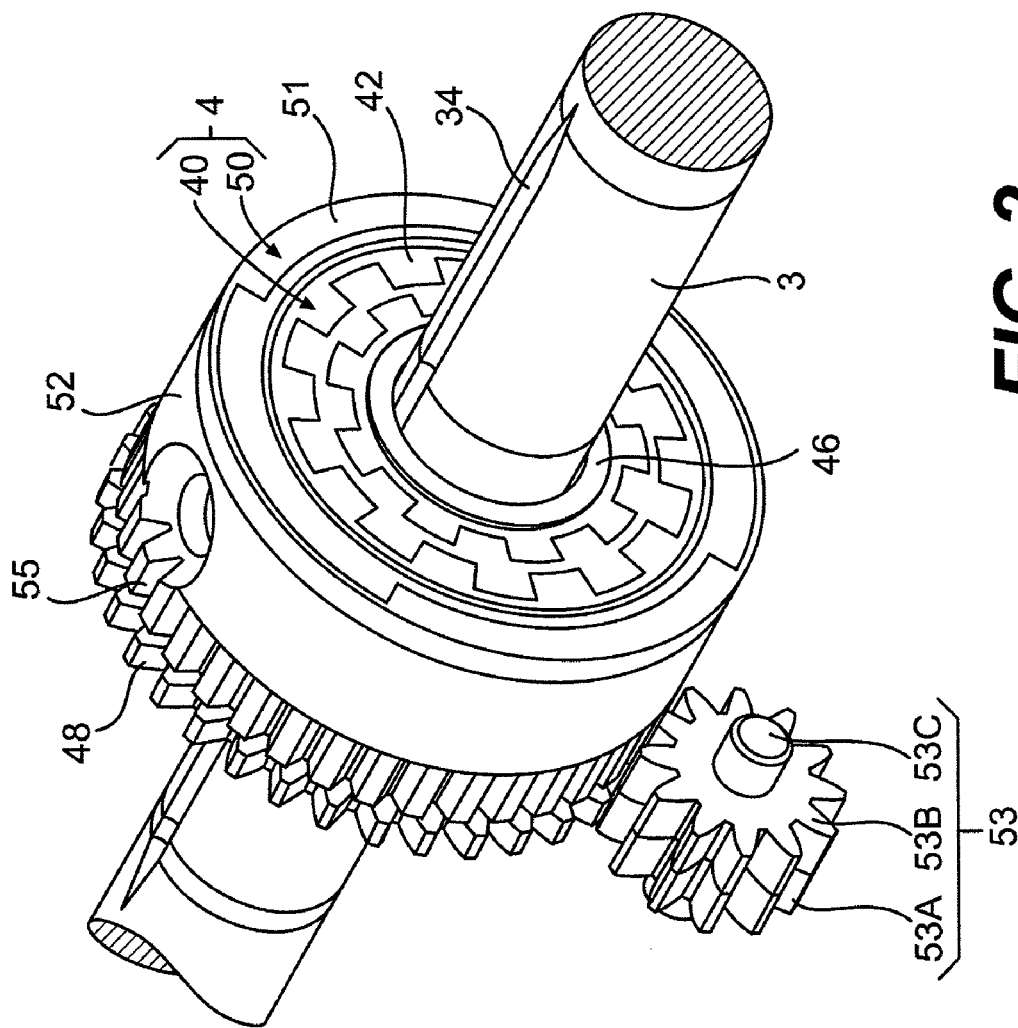
FIG. 2 is a perspective view of an induction detecting rotary encoder.
Figure 3:
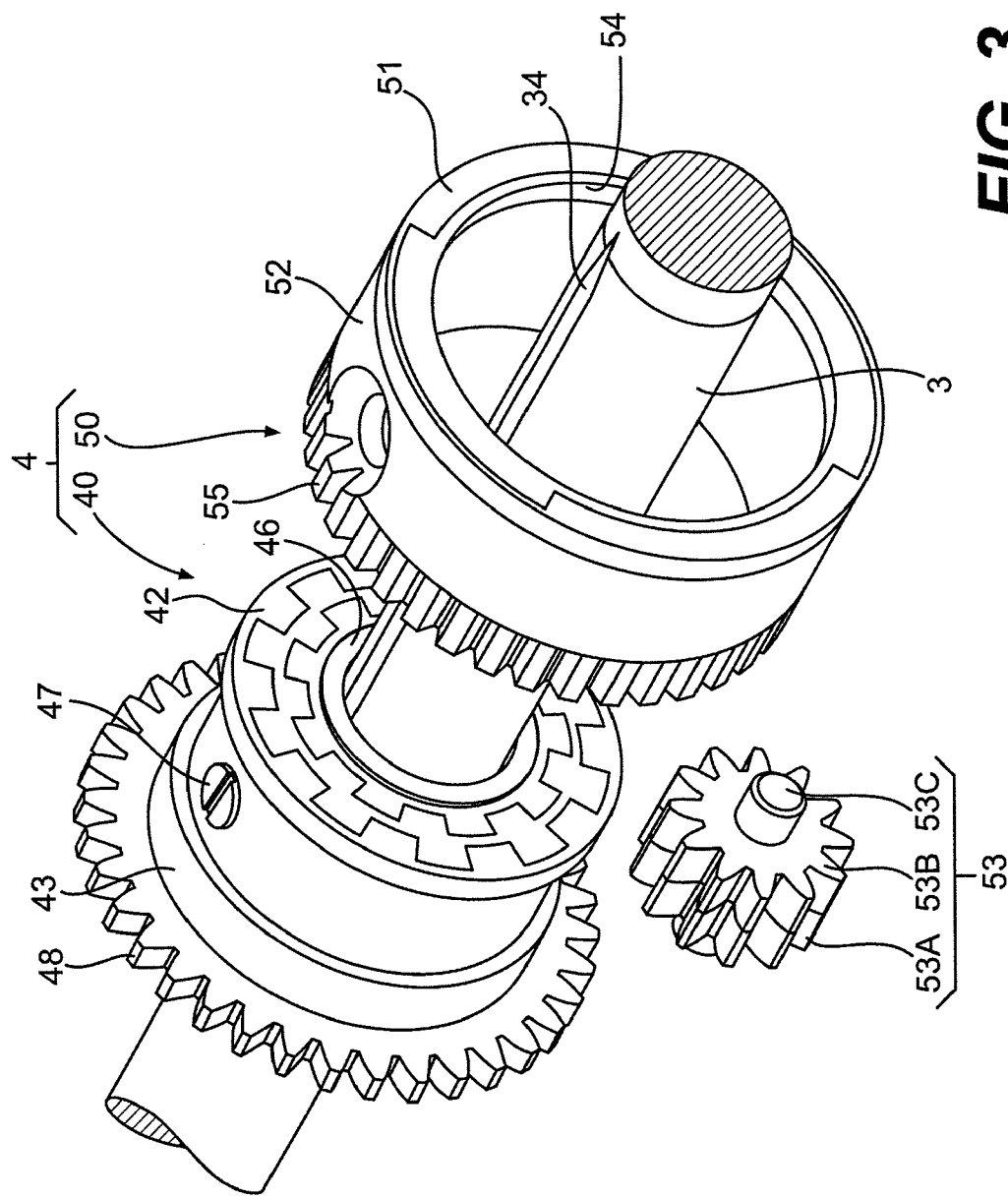
FIG. 3 is an exploded perspective view of the induction detecting rotary encoder.

Subsequently, a configuration of the induction detecting rotary encoder 4 is explained with reference to FIGS. 1 to 3. FIG. 2 is a perspective view of the induction detecting rotary encoder 4. FIG. 3 is an exploded perspective view of the induction detecting rotary encoder 4. As shown in FIGS. 2 and 3, the induction detecting rotary encoder 4 has a first rotary encoder 40 and a second rotary encoder 50, and is housed in the housing space 22 of the main body 2.

The first rotary encoder 40 has a stator 41, a first rotor 42, and a first rotating cylinder 43.

The stator 41 has an insertion hole 44 at the center of a circular plate thereof, through which the spindle 3 is inserted. The stator 41 is fixed to the partitioning plate 23. Specifically, the stator 41 is externally fitted to an insulating member 27, which is provided around the bore 25 of the partitioning plate 23.

The first rotor 42 has an insertion hole 45 at the center of a circular plate thereof, through which the spindle 3 is inserted. The first rotor 42 is provided at a predetermined distance from the stator 41 and provided axially opposite to the stator 41.

When the spindle 3 is inserted through the first rotating cylinder 43, the first rotating cylinder 43 is provided more to the front side of the spindle 3 than the stator 41, and rotatably supports the first rotor 42 around the shaft of the spindle 3. Specifically, a rotor supporter 46 is provided along the external periphery of the spindle 3 at the end portion on the stator 41 side of the first rotating cylinder 43. The first rotor 42 is externally fitted to an external periphery of the rotor supporter 46.

The first rotating cylinder 43 is provided with a screw-type key 47, which is screwed toward the center from the external periphery. An end portion of the key 47 is projected from an inner periphery of the first rotating cylinder 43, and is engaged with the key groove 34 of the spindle 3. Specifically, when the spindle 3 is rotated, the first rotating cylinder 43 is rotated in synchronization with the spindle 3, since the key 47 is engaged with the key groove 34 of spindle 3.

A first gear 48 is provided on the external periphery of the first rotating cylinder 43. The gear 48 is provided to the first rotating cylinder 43 in the end portion on the front side of the spindle 3. The gear 48 has a larger external diameter than that of other portions of the rotating cylinder 43. The first gear 48 has 40 teeth, for instance.

The second rotary encoder 50 has the above-described stator 41, a second rotor 51, a second rotating cylinder (holding body) 52, and a relay gear 53.

The stator 41 is the stator 41 of the first rotary encoder 40, and is a common part for the rotary encoders 40 and 50.

The second rotor 51 has a hole 54 at the center of a circular plate thereof, in which the first rotor 42 can be disposed. The second rotor 51 is thus provided surrounding the first rotor 42 on an external periphery thereof. Similar to the first rotor 42, the second rotor 51 is provided at a predetermined distance from the stator 41 and provided axially opposite to the stator 41. As described above, the surfaces of the rotor 42 and 51, which are provided opposite to the stator 41, are provided substantially flush.

When the first rotating cylinder 43 (a portion excluding the first gear 48) is inserted into the second rotating cylinder 52, the second rotating cylinder 52 is supported by the first rotating cylinder 43. The second rotor 51 is attached to the second rotating cylinder 52 in an end portion thereof on the stator 41 side. The second rotor 51 is thus rotatably supported around the shaft of the spindle 3. Thereby, a bicylindrical configuration is provided having the first rotary encoder 40 inside and the second rotary encoder 50 outside.

A second gear 55 is provided on an external periphery of the second rotating cylinder 52. The gear 55 is provided to the rotating cylinder 52 in an end portion thereof on the front side of the spindle 3. The gear 55 has a substantially same external diameter as that of the gear 48 of the first rotating cylinder 43. The second gear 55 has 41 teeth, for instance, and thus has one tooth more than the first gear 48.

The relay gear 53 is rotatably supported by the main body 2 and is engaged with both the first gear 48 and the second gear 55. Specifically, the relay gear 53 has a first relay gear 53A engaging with the first gear 48, a second relay gear 53B engaging with the second gear 55, and a shaft 53C concentrically supporting the relay gears 53A and 53B. The relay gears 53A and 53B have the same number of teeth of, for example, 12. Modules coincide for the first gear 48 and the first relay gear 53A, which constitute a first pair of gears. Modules coincide for the second gear 55 and the second relay gear 53B, which constitute a second pair of gears. Thus, rotating the first rotating cylinder 43 can smoothly rotate the second rotating cylinder 52 by way of the relay gear 53.

When the gears are rotated, the rotors 42 and 51 are rotated at different speeds because of the difference in the number of teeth of the gear 48 and the gear 55. When the gear 48 has 40 teeth and the gear 55 has 41 teeth as in the present embodiment, for example, the first rotor 42 is rotated 40 times and the second rotor 51 is rotated 39 times while the spindle 3 is rotated 40 times within a range of protraction and retraction movement.

Further, the first rotary encoder 40 and the second rotary encoder 50 can detect an absolute angle within one rotation of the rotor 42 and the rotor 51, respectively. Specifically, the stator 41 outputs a phase signal indicating change in one cycle per rotation of the first rotor 42. Since the first rotor 42 is rotated in synchronization with the spindle 3, the phase signal associated with the first rotor 42 indicates a first cycle change of the present invention in accordance with one rotation of the spindle 3. For instance, while the spindle 3 is rotated 40 times, 40 cycle changes are indicated.

The stator 41 also outputs a phase signal indicating change in one cycle per rotation of the second rotor 51. Since the second rotor 51 is rotated 39 times while the spindle 3 is rotated 40 times, the phase signal associated with the second rotor 51 indicates 39 cycle changes in accordance with 40 rotations of the spindle 3.

Figure 4:
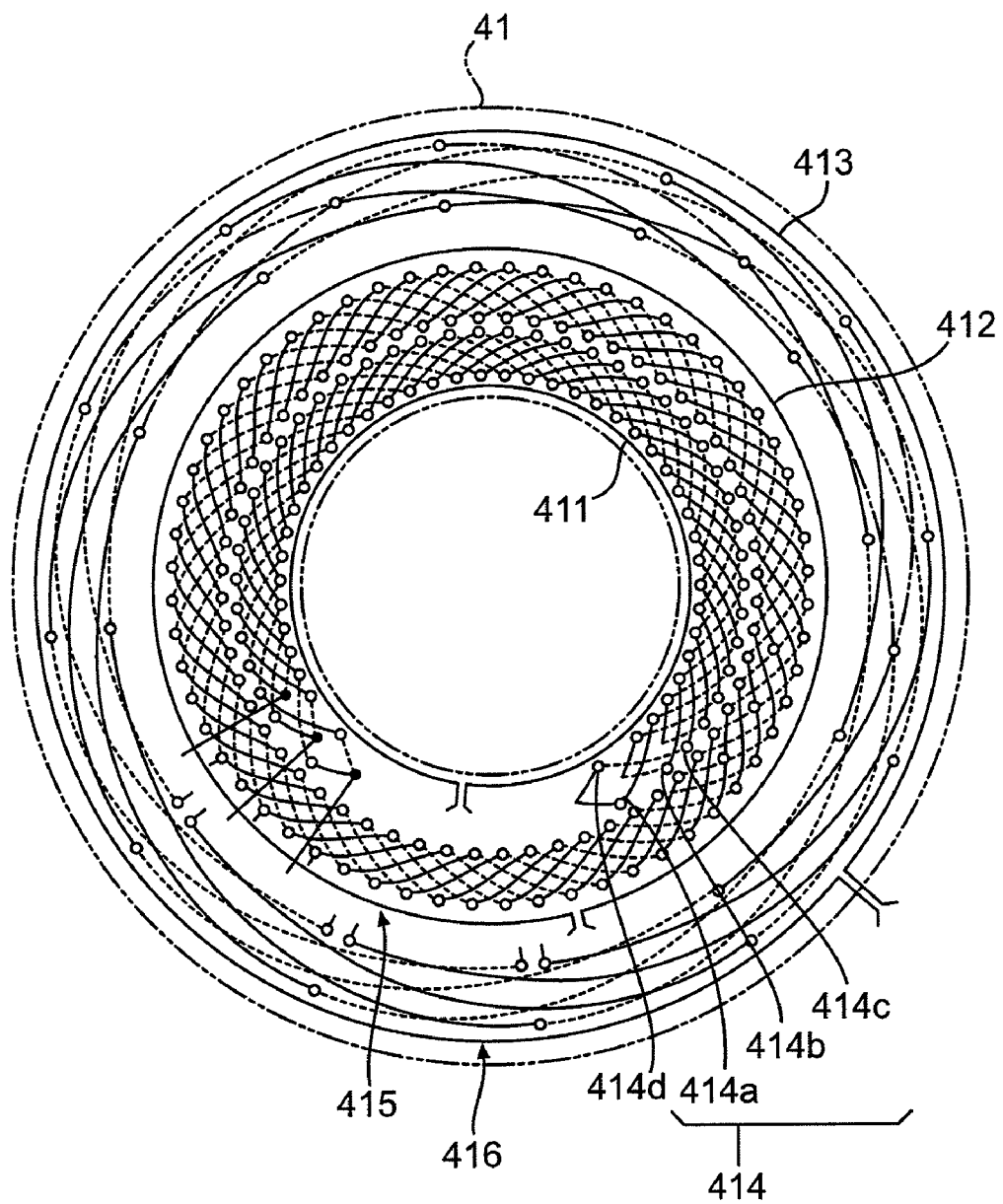
FIG. 4 illustrates a configuration on a stator.
Figure 5:
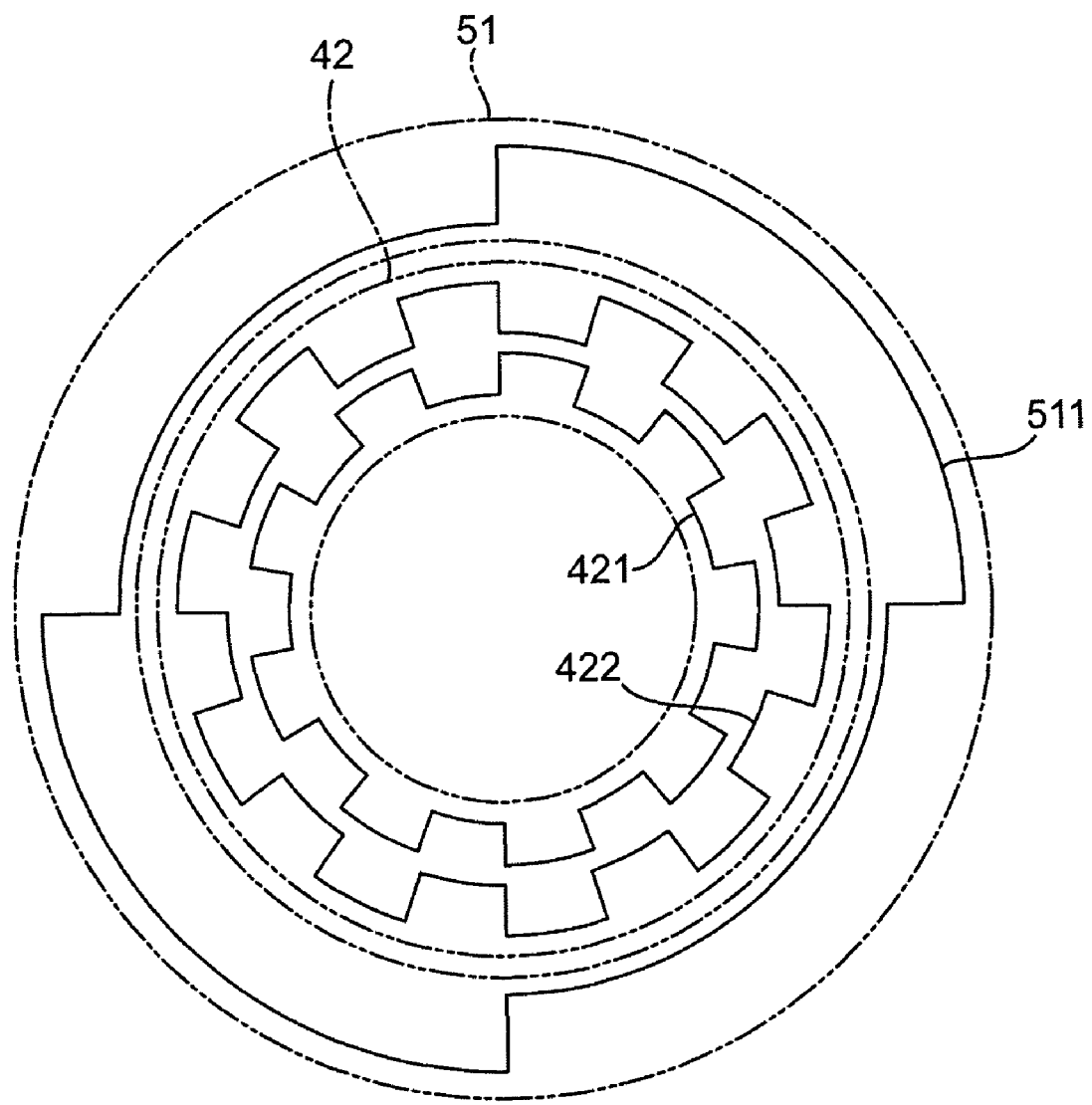
FIG. 5 illustrates a configuration on a first rotor and a second rotor.

Subsequently, configurations on the stator 41, the first rotor 42, and the second rotor 51 are explained with reference to FIGS. 4 and 5. FIG. 4 illustrates a configuration on the stator 41. FIG. 5 illustrates a configuration on the first rotor 42 and the second rotor 51.

As shown in FIG. 4, a first transmitting winding 411, a second transmitting winding 412, and a third transmitting winding 413 are provided concentrically to the spindle 3, on the stator 41 opposing the first rotor 42 and the second rotor 51. The first transmitting winding 411 has a substantially circular shape having a first radius from the spindle 3 (rotating shaft). The second transmitting winding 412 has a substantially circular shape having a second radius from the spindle 3 (rotating shaft), the second radius being larger than the first radius. The third transmitting winding 413 has a substantially circular shape having a third radius from the spindle 3 (rotating shaft), the third radius being larger than the second radius.

As shown in FIG. 4, a first receiving winding 414, a second receiving winding 415, and a third receiving winding 416 are provided concentrically to the spindle 3, on the stator 41 opposing the first rotor 42 and the second rotor 51. The first to third receiving windings 414 to 416 are provided, such that a distance from the spindle 3 (rotating shaft) changes periodically. The first receiving winding 414 is provided between the first transmitting winding 411 and the second transmitting winding 412 on the first transmitting winding 411 side. The second receiving winding 415 is provided between the first transmitting winding 411 and the second transmitting winding 412 on the second transmitting winding 412 side. The third receiving winding 416 is provided between the second transmitting winding 412 and the third transmitting winding 413. The first receiving winding 414 detects a flux generated by a first flux coupling winding 421 hereinafter described. The second receiving winding 415 detects a flux generated by a second flux coupling winding 422 hereinafter described. The third receiving winding 416 detects a flux generated by a third flux coupling winding 511 hereinafter described.

The first receiving winding 414 includes three receiving windings 414a to 414c having different phases in a rotating direction. The receiving windings 414a to 414c have electric wires provided in a loop (diamond) shape. The receiving windings 414a to 414c are provided such that portions crossing each other are aligned above and below a substrate in order to prevent short-circuit of the crossing portions. The receiving windings 414a to 414c are connected to one another through a via hole 414d, and thereby insulated and separated from each other. The second receiving winding 415 and the third receiving winding 416 are configured in a similar manner to the first receiving winding 414.

As shown in FIG. 5, the first flux coupling winding 421 and the second flux coupling winding 422, which are flux coupling bodies, are provided concentrically to the spindle 3, on the first rotor 42 opposing the stator 41. The first flux coupling winding 421 and the second flux coupling winding 422 have a gear shape having protrusions and recesses, such that a distance from the spindle 3 (rotating shaft) periodically changes for $N_1$ times and $N_2$ times, respectively, when the first rotor 42 is rotated one time. The first flux coupling winding 421 is capable of flux-coupling with the first transmitting winding 411. The second flux coupling winding 422 is capable of flux-coupling with the second transmitting winding 412.

The first flux coupling winding 421 has a gear shape having nine ($N_1$) protrusions and nine ($N_1$) recesses, for example. The second flux coupling winding 422 has a gear shape having 10 ($N_2$) protrusions and 10 ($N_2$) recesses, for example. In other words, the number of protrusions and recesses of the second flux coupling winding 422 is different only by one from that of the first flux coupling winding 421.

Further, as shown in FIG. 5, the third flux coupling winding 511 is provided concentrically to the spindle 3, on the second rotor 51 opposing the stator 41. The third flux coupling winding 511 has projections and recesses, such that a distance from the spindle 3 (rotating shaft) periodically changes for $N_3$ times, when the second rotor 51 is rotated one time. The third flux coupling winding 511 is capable of flux-coupling with the third transmitting winding 413.

The third flux coupling winding 511 has a gear shape having two ($N_3$) protrusions and two ($N_3$) recesses, for example. In other words, the number of protrusions and recesses of the third flux coupling winding 511 is less than that of the first flux coupling winding 421 and that of the second flux coupling winding 422.

Figure 6:
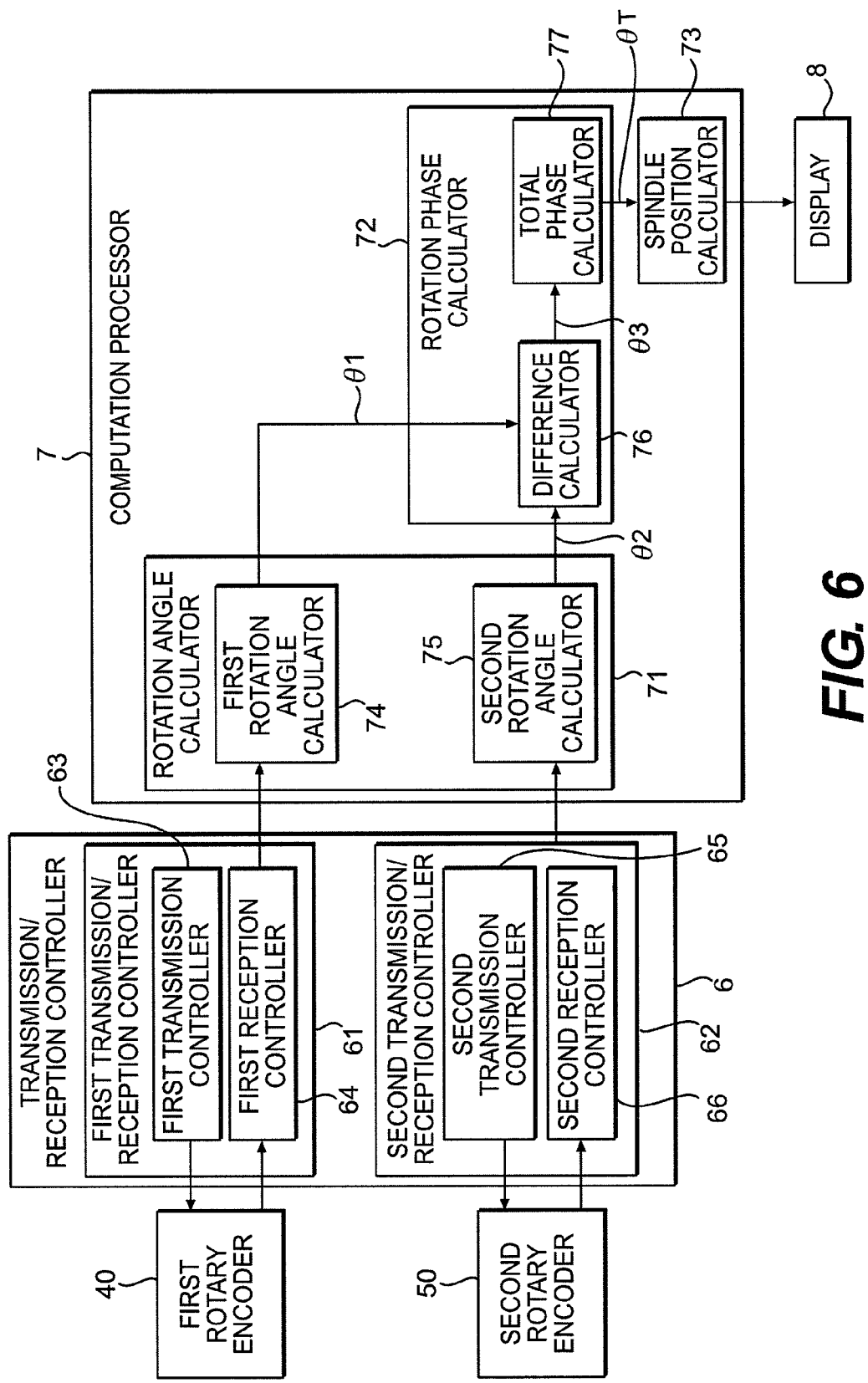
FIG. 6 is a block diagram illustrating a configuration of a transmission/reception controller and a computation processor.

Subsequently, a configuration of the transmission/reception controller 6 and the computation processor 7 is explained in detail with reference to FIG. 6. FIG. 6 is a block diagram illustrating the configuration of the transmission/reception controller 6 and the computation processor 7.

The transmission/reception controller 6 is first explained. The transmission/reception controller 6 has a first transmission/reception controller 61 and a second transmission/reception controller 62. The first transmission/reception controller 61 controls transmission and reception of a signal to and from the first rotary encoder 40. The second transmission/reception controller 62 controls transmission and reception of a signal to and from the second rotary encoder 50.

The first transmission/reception controller 61 has a first transmission controller 63 and a first reception controller 64. The first transmission controller 63 transmits to the stator 41, a predetermined AC signal for the first rotor 42 (for the first transmitting winding 411 and the second transmitting winding 412). The first reception controller 64 receives from the stator 41 (the first receiving winding 414 and the second receiving winding 415), a phase signal for the first rotor 42.

The phase signal herein refers to a signal indicating a phase difference between a signal based on the first flux coupling winding 414 and a signal based on the second flux coupling winding 415.

Similarly, the second transmission/reception controller 62 has a second transmission controller 65 and a second reception controller 66. The second transmission controller 65 transmits to the stator 41, a predetermined AC signal for the second rotor 51 (for the third transmitting winding 413). The second reception controller 66 receives from the stator 41 (the third receiving winding 416), a phase signal for the second rotor 51. The first reception controller 64 and the second reception controller 66 output to the computation processor 7, the phase signals of the rotors 42 and 51, respectively, received from the stator 41.

Subsequently, the computation processor 7 is explained. The computation processor 7 has a rotation angle calculator 71, a rotation phase calculator 72, and a spindle position calculator 73. The rotation angle calculator 71 calculates rotation angles θ1 and θ2 of the first rotor 42 and the second rotor 51, respectively. The rotation phase calculator 72 calculates a rotation phase of the spindle 3 based on the rotation angles θ1 and θ2 of the first rotor 42 and the second rotor 51, respectively, calculated by the rotation angle calculator 71. The spindle position calculator 73 calculates an absolute position of the spindle 3 based on the rotation phase of the spindle 3 calculated by the rotation phase calculator 72.

The rotation angle calculator 71 has a first rotation angle calculator 74 and a second rotation angle calculator 75. The first rotation angle calculator 74 calculates the rotation angle θ1 of the first rotor 42, based on the phase signal from the first reception controller 64. The second rotation angle calculator 75 calculates the rotation angle θ2 of the second rotor 51, based on the phase signal from the second reception controller 66.

Based on the phase signal from the first reception controller 64, the first rotation angle calculator 74 calculates the rotation angle θ1 of the first rotor 42 as an absolute angle (0°<θ1<360°) within one rotation. The phase signal from the first reception controller 64 herein does not generate an identical phase within one rotation of the first rotor 42. The first rotation angle calculator 74 sets and stores the rotation angle θ1 of the first rotor 42 and the phase signal as a pair. Thus, the rotation angle θ1 of the first rotor 42 is unambiguously determined in accordance with the phase signal output from the first reception controller 64, and thereby the absolute angle within one rotation of the first rotor 42 is calculated.

Similar to the first rotation angle calculator 74, the second rotation angle calculator 75 calculates the rotation angle θ2 of the second rotor 51 as an absolute angle within one rotation, based on the phase signal from the second reception controller 66.

The rotation phase calculator 72 has a difference calculator 76 and a total rotation phase calculator 77. The difference calculator 76 calculates a difference θ3 between the rotation angles θ1 and θ2 of the rotors 42 and 51, respectively, calculated by the rotation angle calculator 71. The total rotation phase calculator 77 calculates a total rotation phase of the spindle 3 based on the difference θ3.

The total rotation phase calculator 77 sets and stores the difference θ3 and the total rotation phase of the spindle 3 as a pair. Specifically, the difference between the rotation angles θ1 and θ2 of the rotors 42 and 51, respectively, is set to one rotation while the spindle 3 is rotated 40 times within the range of protraction and retraction movement. Thus, the difference θ3 is calculated within the range of 0° and 360°, and a total rotation phase θT of the spindle 3 is unambiguously calculated based on the difference θ3.

A movement pitch (0.5 mm) per rotation of the spindle 3 is preset and stored in the spindle position calculator 73. The spindle position calculator 73 then multiplies the movement pitch (0.5 mm) by the total rotation phase θT, and thus calculates a total movement amount of the spindle 3, i.e., an absolute position of the spindle 3. The display 8 displays the absolute position of the spindle 3 in a digital format, for example.

Operations of Micrometer Head 1 According to First Embodiment

Subsequently, operations are explained of the configuration above according to the present embodiment. When the spindle 3 is rotated by using the knob 32, the male thread 26 of the main body 2 and the lead thread 33 of the spindle 3 are engaged, and thereby the spindle 3 is axially protracted and retracted. When the spindle 3 is rotated, the first rotating cylinder 43 is rotated along therewith by the key 47, which is engaged with the key groove 34 of the spindle 3.

When the first rotating cylinder 43 is rotated, the first rotor 42 is rotated along therewith. The rotation of the first rotor 42 is detected by the stator 41, and transferred to the first reception controller 64. Subsequently, the first rotation angle calculator 74 calculates the rotation angle θ1 within one rotation of the first rotor 42.

Since the first rotor 42 is rotated in synchronization with the spindle 3, the rotation angle θ1 within one rotation of the first rotor 42 indicates an rotation angle within one rotation of the spindle 3.

Further, when the first rotating cylinder 43 is rotated, the first relay gear 53A of the relay gear 53, which is engaged with the gear 48 of the first rotating cylinder 43, is rotated. Furthermore, the gear 55 of the second rotating cylinder 52 is rotated, which is engaged with the second relay gear 53B of the relay gear 53. Thus, the second rotor 51 is rotated along with the second rotating cylinder 52. The phase signal within one rotation of the second rotor 51 is detected by the stator 41, and transferred to the second reception controller 66. Subsequently, the second rotation angle calculator 75 calculates the rotation angle θ2 within one rotation of the second rotor 51.

Subsequently, the rotation phase calculator 72 calculates the difference θ3 of the rotation angles θ1 and θ2 of the rotors 42 and 51, respectively, and then, based on the difference θ3, calculates the total rotation phase θT of the spindle 3. Finally, the spindle position calculator 73 calculates the absolute position of the spindle 3, based on the total rotation phase θT and the feed pitch (0.5 mm) of the spindle 3. The absolute position of the spindle 3 is displayed on the display 8.

Effects of Micrometer Head 1 According to First Embodiment

The configuration above according to the present embodiment provides effects described below.

(1) Internally providing two different tracks having a small pitch and a pitch difference of only one enables detection of the absolute position within one rotation in a sufficiently accurate manner. Further, externally adding one track having a large pitch (two pitches) enables detection of the number of rotation of the spindle 3. Thus, highly accurate absolute measurement can be achieved over a long measurement range as a whole.

(2) The second rotor 51 is rotated by the rotation of the first rotor 42 by way of the relay gear 53. Thus, the rotation speed of the first rotor 42 and that of the second rotor 51 can easily be set differently by setting the number of teeth of the first gear 48 to 40 and that of the second gear 55 to 41. Accordingly, the phase signals output from the rotary encoders 40 and 50 can be set to have different cycles from each other. In other words, the absolute position of the spindle 3 can be calculated based on the two phase signals.

(3) The first rotor 42 and the second rotor 51 are fixed to the rotating cylinders 43 and 52, respectively, at one end portion of each, and then the second rotor 51 is provided external to the first rotor 42. Thereby, the stator 41 can be provided as a common part to the rotary encoders, thus reducing the space of the stator 41, the number of parts, and assembly work load.

(4) The first gear 48 of the first rotating cylinder 43 and the second gear 55 of the second rotating cylinder 52 are adjacently provided in the shaft direction of the spindle 3. Further, the first gear 48 and the second gear 52 have a substantially identical external diameter. Thus, the gear of the relay gear 53 can be engaged simultaneously with the first gear 48 and the second gear 55. Compared to a case in which the relay gear 53 has a multi-step gear, the space of the relay gear 53 can be reduced.

Second Embodiment

Entire Configuration of Micrometer Head 1a of Second Embodiment

Figure 7:
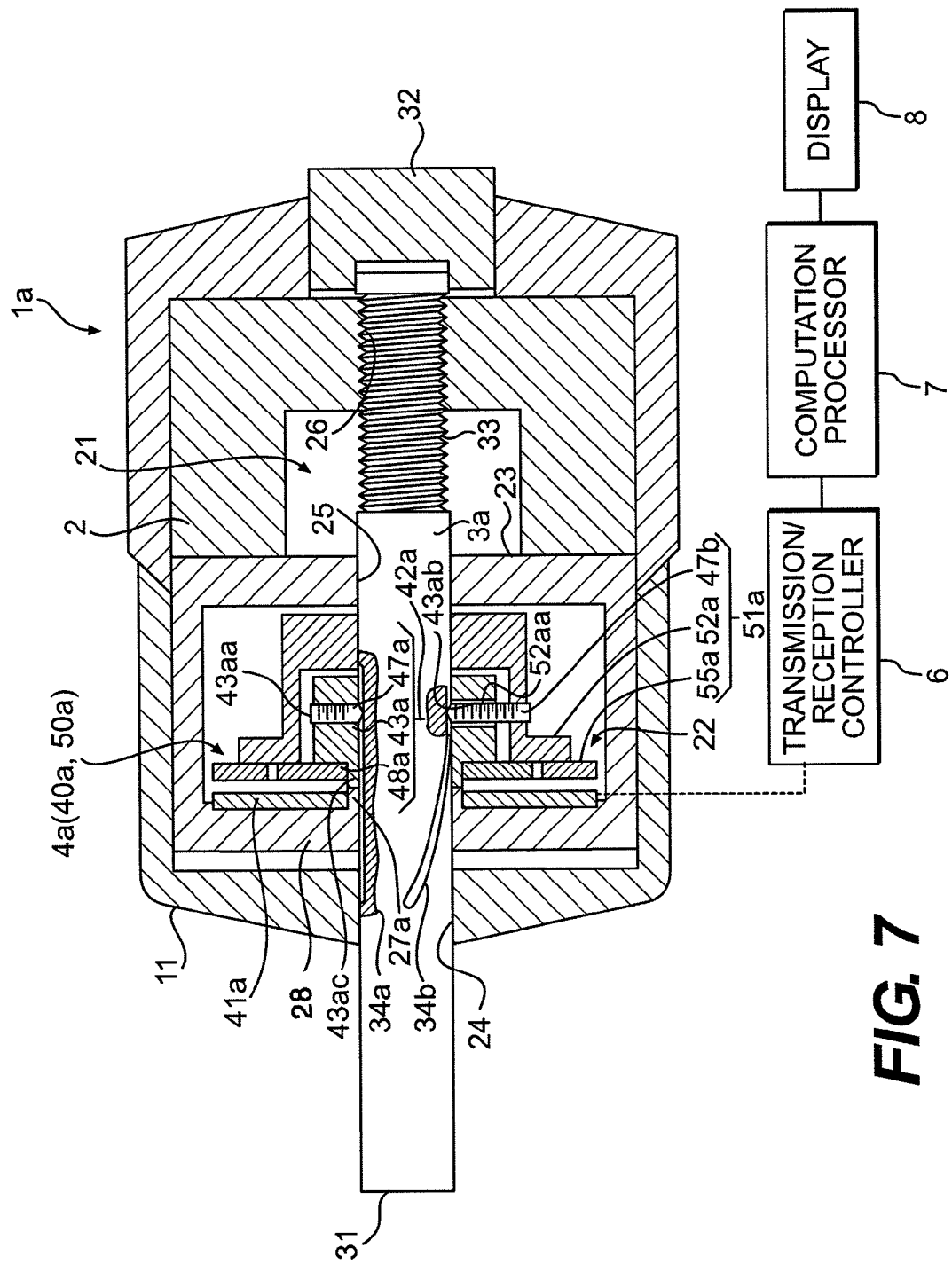
FIG. 7 is a cross-sectional view illustrating a micrometer head according to a second embodiment.

An entire configuration of a micrometer head 1a according to the second embodiment is explained below with reference to FIG. 7, the micrometer head 1a being mounted with an induction detecting rotary encoder 4a. FIG. 7 is a cross-sectional view illustrating the micrometer head 1a according to the second embodiment. In the second embodiment, components similar to the first embodiment are provided with identical reference numerals, and explanations thereof are omitted.

As shown in FIG. 7, the micrometer head 1a has a spindle 3a, which is different from the first embodiment, and an induction detecting rotary encoder 4a provided centering around the spindle 3a. The micrometer head 1a has a similar configuration to the first embodiment for other components.

Similar to the first embodiment, the spindle 3a has a substantially column shape. The spindle 3a has a contact surface 31 in a front end portion and a knob 32 in a base end portion, the contact surface 31 being contacted with an object to be measured (not shown in the drawing).

Unlike the first embodiment, two key grooves 34a and 34b having different lead angles are provided in a middle portion of the spindle 3a. The first key groove 34a is linearly provided in parallel with a shaft of the spindle 3a. The second key groove 34b is provided spirally with respect to the spindle 3a. A start point position and an end point position of the first key groove 34a and those of the second key groove 34b substantially coincide in a shaft direction of the spindle 3a. Specifically, the first key groove 34a and the second key groove 34b are provided in a substantially same range in the shaft direction of the spindle 3a.

When the spindle 3a is protracted and retracted, the key grooves 34a and 34b are positioned external to a main body 2 along with the spindle 3a. An external frame 11 is provided in order to prevent the key grooves 34a and 34b from being exposed externally even when the spindle 3a is protracted at a maximum.

Figure 8:
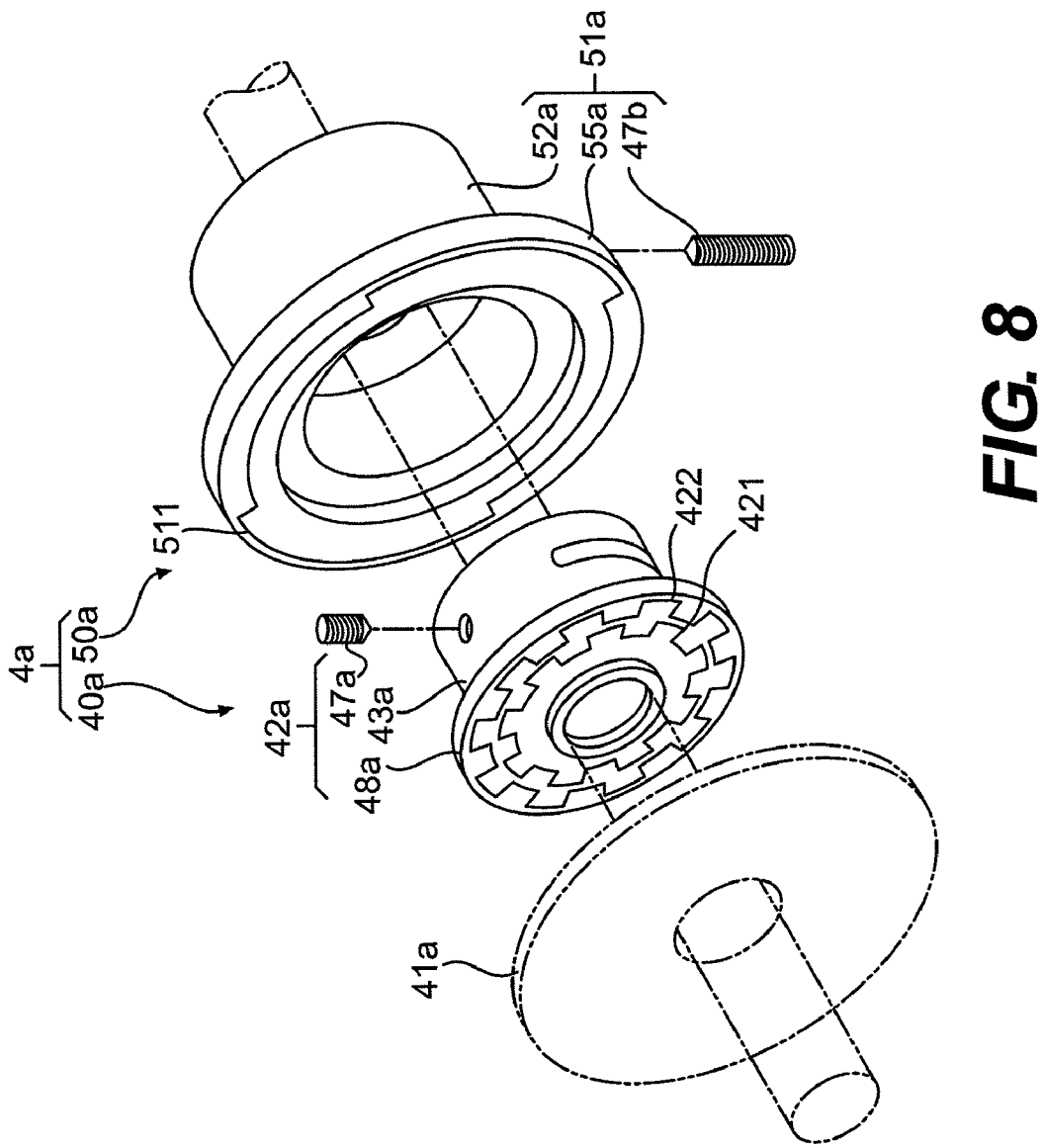
FIG. 8 is an exploded perspective view of an induction detecting rotary encoder.

Subsequently, the induction detecting rotary encoder 4a is explained. FIG. 8 is an exploded perspective view of the induction detecting rotary encoder 4a. As shown in FIG. 8, the induction detecting rotary encoder 4a has a first rotary encoder 40a and a second rotary encoder 50a, and is housed in a housing space 22 of the main body 2.

The first rotary encoder 40a has a stator 41a and a first rotor 42a. The first rotor 42a is provided with a key 47a engaged with the key groove 34a, and is rotatably provided around the spindle 3a.

The stator 41a is fixed to a front side internal wall 28 of the housing space 22, when the spindle 3a is inserted.

The first rotor 42a is provided immediately external to the spindle 3a. The first rotor 42a is provided at a predetermined distance from the stator 41a and provided axially opposite to the stator 41a. The first rotor 42a has a first rotor plate 48a, a first rotating cylinder 43a, and a first key 47a. The first rotor plate 48a is rotated in a pair with the stator 41a in a state opposite to the stator 41a. The first rotating cylinder 43a supports rotation of the first rotor plate 48a around the spindle 3a. The first key 47a is engaged with the first key groove 34a. The first rotor plate 48a is a small circular plate having a hole through which the spindle 3a is inserted.

The first rotating cylinder 43a has a cylindrical shape externally fitted to the spindle 3a. The first rotating cylinder 43a is connected to a rear surface of the first rotor plate 48a so as to support the rotation of the first rotor plate 48a. The first rotating cylinder 43a is provided with two holes 43aa and 43ab therethrough orthogonal to the shaft. The first hole 43aa is engaged with the first key 47a. The second hole 43ab has an elongated shape having a length in a circumferential direction of the first rotating cylinder 43a.

The second rotary encoder 50a has the stator 41a and a second rotor 51a. The second rotor 51a is provided with a key 47b engaged with the key groove 34b, and is rotatably provided around the spindle 3a.

The second rotor 51a is provided external to the first rotor 42a so as to surround the first rotor 42a. The second rotor 51a is provided at a predetermined distance from the stator 41a and provided axially opposite to the stator 41a. Similar to the first rotor 42a, the second rotor 51a has a second rotor plate 55a, a second rotating cylinder 52a, and a second key 47b. The second rotor plate 55a is rotated in a pair with the stator 41a in a state opposite to the stator 41a. The second rotating cylinder 52a supports rotation of the second rotor plate 55a around the spindle 3a. The second key 47b is engaged with the second key groove 34b.

The second rotor plate 55a is an annular plate having an inner hole through which the first rotor plate 48a is loosely fitted. The second rotating cylinder 52a is connected to a rear surface of the second rotor plate 55a. The second rotating cylinder 52a has a cylindrical shape having a hole thereinside through which the first rotating cylinder 43a is loosely fitted.

The second rotating cylinder 52a is provided with a hole 52aa therethrough orthogonal to the shaft. The first hole 52aa is engaged with the second key 47b. The second key 47b is engaged with the second key groove 34b by passing through the second hole 43ab, which is an elongated hole of the first rotating cylinder 43a.

The second rotating cylinder 52a has a shaft receiver 52ab that supports the shaft of the spindle 3a, the shaft receiver 52ab being provided on an opposite side to the stator 41a having the first rotor 42a in between. Further, the second key 47b is provided at a substantially same position in the spindle shaft direction as the first key 47a of the first rotating cylinder 43a.

On the front side internal wall 28 of the housing space 22 to which the stator 41a is fixed, a spindle shaft receiver 27a is provided extending toward a rear end side slightly more than the stator 41a. A spindle shaft receiver 43ac of the first rotating cylinder 43a is provided extending slightly more toward the stator 41a than the first rotor plate 48a. The spindle shaft receiver 43ac of the first rotating cylinder 43a is provided in contact with the spindle shaft receiver 27a of the main body 2. Thereby, a gap between the stator 41a and the first rotor plate 48a is appropriately secured.

A coil spring (biasing portion; not shown in the drawing) is provided between the second rotating cylinder 52a and a partitioning plate 23. The second rotor 51a is biased toward the stator 41a, and the first rotor 42a is pressed at an internal wall of the second rotating cylinder 52a. Thus, the first rotor 42a is also biased toward the stator 41a.

Operations of Micrometer Head 1a According to Second Embodiment

Subsequently, operations are explained of the micrometer head 1a having the configuration above according to the second embodiment. When the spindle 3a is rotated by using the knob 32, the male thread 26 of the main body 2 and the lead thread 33 of the spindle 3a are engaged, and thereby the spindle 3a is axially protracted and retracted.

When the spindle 3a is rotated, the first rotating cylinder 43a and the second rotating cylinder 52a are rotated accordingly, since the first key 47a of the first rotating cylinder 43a is engaged with the key groove 34a of the spindle 3a, and the second key 47b of the second rotating cylinder 52a with the second key groove 34b. At the time, the spindle shaft receiver 43ac of the first rotating cylinder 43a supports the shaft of the spindle 3a, and thus the first rotating cylinder 43a is rotated with reference to the spindle 3a. Further, a shaft receiver 622 of the second rotating cylinder 52a supports the shaft of the spindle 3a, and thus the second rotating cylinder 52a is also rotated with reference to the spindle 3a.

The first key groove 34a and the second key groove 34b have different lead angles from each other. Thus, the first rotating cylinder 43a and the second rotating cylinder 52a are rotated at different rotation amounts (rotation phases) from each other when the spindle 3a is rotated one time. When the first and second rotating cylinders 43a and 52a are rotated in accordance with the rotation of the spindle 3a, the first rotor plate 48a is rotated along with the first rotating cylinder 43a, and the second rotor plate 55a is rotated along with the second rotating cylinder 52a. In other words, the first rotor 42a is rotated at a different rotation speed from the second rotor 51a in the second embodiment, similar to the first embodiment.

Similar to the first embodiment, first and second flux coupling windings 421 and 422 are also provided on the first rotor 42a opposite to the stator 41 in the second embodiment. A third flux coupling winding 423 is provided on the second rotor 51a opposite to the stator 41. First to third transmitting windings 411 to 413 and first to third receiving windings 414 to 416 are provided on the stator 41a opposite to the first and second rotors 42a and 51a.

Effects of Micrometer Head 1a According to Second Embodiment

Since the micrometer head 1a of the second embodiment is configured substantially similar to the first embodiment, the micrometer head 1a has similar effects to those of the first embodiment.

Other Embodiments

The embodiments of the induction detecting rotary encoder according to the present invention were explained above. The present invention, however, is not limited to the embodiments above, and may be modified, added, and replaced in a variety of ways within the scope of the purpose of the present invention. For instance, the first to third flux coupling bodies are not necessarily embodied as the first to third flux coupling windings 421, 422, and 511, but may be provided as an electrode, a hole provided in a conductive plate, a recess, and the like.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

What is claimed is:

1. An induction detecting rotary encoder comprising:
   a stator;
   a first rotor engaged with a rotating shaft, rotated along with the rotating shaft, and provided axially opposite to the stator;
   a second rotor provided on an external periphery side of the first rotor, rotatable with respect to the first rotor, and axially opposite to the stator;
   a rotation transferer transferring rotation of the rotating shaft and rotating the second rotor at a speed different from the first rotor;
   a first transmitting winding, a second transmitting winding, and a third transmitting winding provided in order from inside concentrically to the rotating shaft, on a surface opposite to the first rotor and the second rotor of the stator;
   a first receiving winding, a second receiving winding, and a third receiving winding provided in order from inside concentrically to the rotating shaft, on the surface opposite to the first rotor and the second rotor of the stator, and associated with the first transmitting winding, the second transmitting winding, and the third transmitting winding;
   a first flux coupling body and a second flux coupling body provided in order from inside concentrically to the rotating shaft, on the surface opposite to the stator of the first rotor, the first flux coupling body flux-coupling with the first transmitting winding and the first receiving winding, the second flux coupling body flux-coupling with the second transmitting winding and the second receiving winding; and
   a third flux coupling body provided external to the first flux coupling body and the second flux coupling body concentrically to the rotating shaft, on the surface opposite to the stator of the second rotor, and flux-coupling with the third transmitting winding and the third receiving winding; wherein the first transmitting winding, the first receiving winding, and the first flux coupling body constitute a first angle detection track generating a cyclic change for $N_1$ times per single rotation of the first rotor;

the second transmitting winding, the second receiving winding, and the second flux coupling body constitute a second angle detection track generating a cyclic change for $N_2$ times per single rotation of the first rotor;

the third transmitting winding, the third receiving winding, and the third flux coupling body constitute a third angle detection track generating a cyclic change for $N_3$ times per single rotation of the second rotor;

$N_1$, $N_2$, and $N_3$ are different from one another; and $N_3$ is less than $N_1$ and $N_2$.

2. The induction detecting rotary encoder according to claim 1, wherein $N_3$ is "2."

3. The induction detecting rotary encoder according to claim 1, wherein a difference between $N_1$ and $N_2$ is "1."

4. The induction detecting rotary encoder according to claim 2, wherein a difference between $N_1$ and $N_2$ is "1."

* * * * *